Sept. 26, 1967  S. ABKOWITZ  3,343,998
HIGH STRENGTH WROUGHT WELDABLE TITANIUM
ALLOY MILL PRODUCT MANUFACTURE
Filed Jan. 6, 1964  2 Sheets-Sheet 1
FIG. 2
FIG. 3
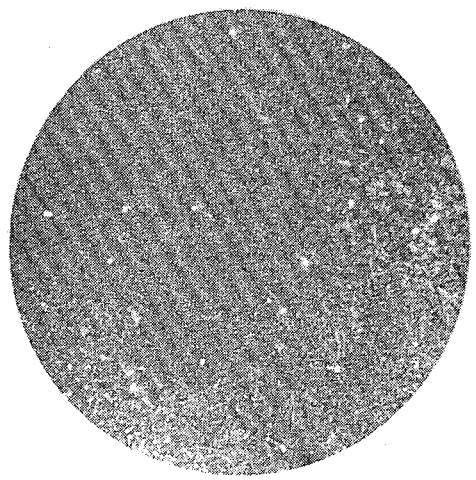
FIG. 1
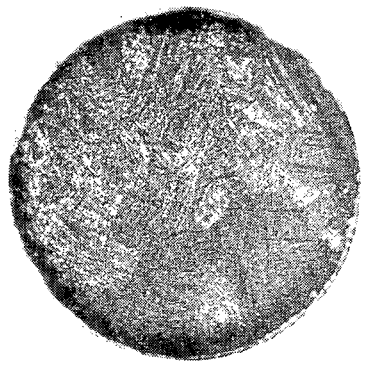
FIG. 4
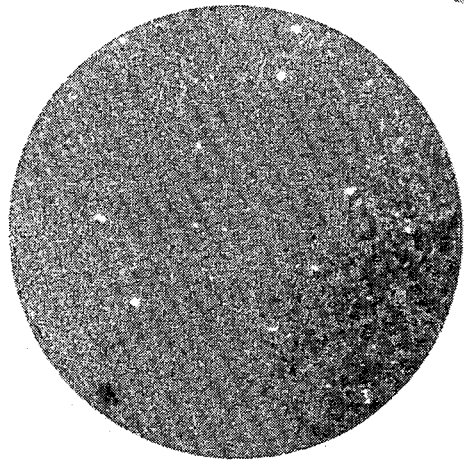
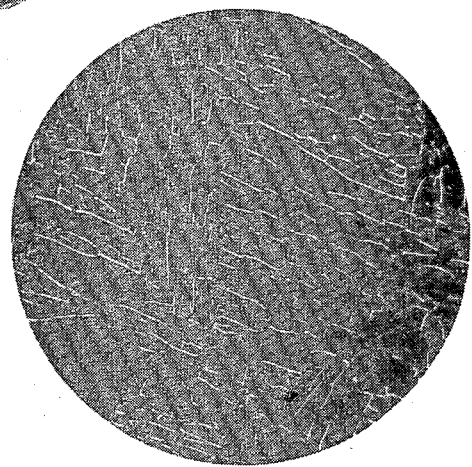
INVENTOR
STANLEY ABKOWITZ
Frease, Bishop, Johns & Schick
ATTORNEYS Sept. 26, 1967 S. ABKOWITZ 3,343,998
HIGH STRENGTH WROUGHT WELDABLE TITANIUM
ALLOY MILL PRODUCT MANUFACTURE
Filed Jan. 6, 1964 2 Sheets-Sheet 2

INVENTOR.
Stanley Abkowitz
BY
Frease, Bishop, Johns & Schick
ATTORNEYS

United States Patent Office 3,343,998
Patented Sept. 26, 1967

3,343,998
HIGH STRENGTH WROUGHT WELDA-
BLE TITANIUM ALLOY MILL PROD-
UCT MANUFACTURE
Stanley Abkowitz, Lexington, Mass., assignor, by mesne
assignments, to Whittaker Corporation, Los Angeles,
Calif., a corporation of California
Filed Jan. 6, 1964, Ser. No. 335,799
10 Claims. (Cl. 148—12.7)

The invention relates to titanium base alloy mill products and their manufacture; and more particularly to high strength wrought weldable titanium base alloy mill products having a new combination of mechanical and structure properties and characteristics which the art has lacked, and to procedures for the manufacture of such mill products to achieve such new combination of properties.

Developments and uses of titanium alloys and titanium alloy mill products for some years have been stalemated in attempts to satisfy an existing want and need for various kinds of titanium alloy mill products of strength greater than 120,000 p.s.i. consistent with good weldability. The problem stems from the fact that in order to have good weldability the alloy must be single phase. The only three useful alloying elements which permit retention of an all-alpha base structure are Al, Sn and Zr. The interstitials C, $O_2$ and $N_2$ are also alpha stabilizers but these are detrimental to both base and weld metal ductility. Solid solution strengthening with the substitutional alpha strengtheners, either individually or in combination, tapers off at around 110,000 to 120,000 p.s.i.

Higher strengths may be obtained by adding beta stabilizers such as Fe, Cr, Mn, Mo and V. These beta stabilizers in themselves do not solid solution strengthen greater than 110,000 to 120,000 p.s.i., but they do permit quench and age heat treatment to strengths of 150,000 to 200,000 p.s.i. Such alloys, however, are not desirable where ductile welds are required. The stalemate has existed in attempts to provide the weldability of all-alpha alloys consistent with the strength achieved by the heat treatment of beta strengthened alloys.

Abkowitz et al. Pats. Nos. 2,864,698 and 2,864,699 disclose very lean alpha-beta alloys, such as an 8Al–2Cb–1Ta (Cb and Ta are very weak beta stabilizers) titanium base alloy, which are highly weldable. This characteristic is present because both Cb and Ta in small amounts make Ti alloys very shallow hardening (very low joining hardenability). Laboratory research has indicated that sheet material produced of the 8Al–2Cb–1Ta alloy, .040 inch and less, can be age hardened, by solution treatment followed by quench and age, to strengths greater than 150,000 p.s.i. Table III of Pat. No. 2,864,699 shows such hardening in heat treated .040 inch sheet.

The degree of strengthening by heat treatment of such shallow hardening alloy is a function of thickness and as such is variable. Thus, a given heat treatment will produce variation in strength properties for .020 inch sheet as opposed to .060 inch sheet because of the variation in cooling rate from the specified sheet thickness. As a result, strength characteristics cannot be reliably reproduced, even in the thin gauges of sheet material.

Furthermore, the heat treatment of such thin gauge sheet material fabricated from the 8Al–2Cb–1Ta titanium base alloy cannot be applied practically because of the difficulties involved in processing and handling large size heated sheets in the quenching step, because of sheet warping occurring when quenching, and because of the straightening procedures necessary to eliminate warpage and provide flatness.

From another aspect, the strength of this alloy cannot be increased when the mill products are in the form of heavier gauge sheets, plates, bars, rods, slabs, extruded shapes, etc., because of the shallow-hardening characteristic. Only the skin-like zone of the surface of such mill products is hardened on quenching. The remaining portion of the metal in a massive section cools slowly, and is in effect annealed, with resulting strength characteristics of single phase alloys. This, of course, involves the same considerations that render the alloy highly weldable.

I have discovered a solution to this problem, which eliminates the existing stalemate and satisfies the existing need for wrought titanium base alloy mill products having cross-sectional configurations unrestricted as to maximum dimension, which are highly weldable, and which have the high strength characteristics that result from solution treatment, quenching and aging.

In accordance with the invention 7Al–2Cb–1Ta or 8Al–2Cb–1Ta titanium base alloy material, for example, is converted to separate particle form accompanied by heating at least to solution treatment temperature and by quenching. The size and dimensions of the alloy material particles is much smaller than, say, the thickness of .020″ thick sheet material. Thus, even though the alloy material is shallow-hardening, in particle size it responds fully and completely throughout each particle to the solution treatment and quench. Each particle has uniform strength, hardness and as-quenched characteristics throughout.

The particles are then heated, compacted and consolidated by plastic deformation, reduction and working to the necessary extent or degree to produce a wrought mill product having any desired cross-sectional configuration. During such heating and hot working the temperature must be controlled not to be above the aging temperature range for the alloy and preferably not above the optimum aging temperature for the alloy. This temperature control is vital since it is only by this means that essentially the quenched properties are retained and not destroyed in the alloy particles. Heating and working at aging temperature to compact and consolidate the particles to solid form in effect constitute a part of an aging step carried out for a short time.

After consolidation, the aging procedure may be completed by heating the wrought mill product at aging temperature for the desired length of time, which also acts to stress relieve the hot worked product.

The hot working of the particles which initially exist in the solution treated and quenched condition, at aging temperature which is low, and for a short time, permits the particles consolidated into a wrought mill product to remain in the solution treated, quenched and partially aged condition. These conditions pertain to each particle so that the same conditions pertain uniformly throughout the entire wrought mill product which is composed of consolidated particles.

In this manner deep hardening properties in effect are incorporated in wrought mill products formed from shallow-hardening alloys and a rare combination of properties—high strength (in excess of 160,000 p.s.i. yield strength) and weldability with retained ductility—are present in the wrought mill products produced.

Accordingly, it is a fundamental object of the present invention to provide new wrought titanium base alloy mill products having any desired shape or section and having a new combination of properties—weldability and high strength developed by solution treatment, quenching and aging.

Also, it is an object of the present invention to provide a new procedure for the manufacture of wrought titanium base alloy mill products having any desired cross-sectional configuration, unrestricted as to maximum dimension or thickness, from weldable titanium base alloys, and having uniform high strength (in excess of 160,000 p.s.i.)

properties—achieved from solution treatment, quenching and aging—characterizing the mill products produced.

Moreover, it is an object of the present invention to provide for the manufacture of wrought titanium base alloy mill products from weldable shallow-hardening alloys with the final mill product characterized by deep hardening properties and capable of being welded with retained ductility.

In addition, it is an object of the present invention to manufacture wrought mill products from consolidated, atomized and liquid quenched particles, powder or "shot" of shallow-hardening titanium alloy material, and to thereby effectively by-pass the effect of the shallow-hardening properties of the alloy and obtain uniformity of properties throughout the solid mill product mass.

Also, it is an object of the present invention to combine aging and plastic deformation procedures in the manufacture of titanium alloy mill products to avoid loss of the strength properties in the mill products produced which were developed by solution treatment and quenching.

Finally, it is an object of the present invention to provide new titanium alloy wrought mill products and procedures for making such products which have the indicated advantages, characteristics, properties, structures and uses, which solve problems and satisfy needs existing in the art, which provide a rare new combination of properties, and which eliminate difficulties heretofore encountered in the art and obtain the new results indicated in a commercially satisfactory and reliably reproducible manner.

These and other objects and advantages apparent to those skilled in the art from the following description and claims may be obtained, the stated results achieved, and the described difficulties overcome by the concepts, discoveries, principles, procedures, methods, steps, treatments, mill products, and product characterizing properties and structures which comprise the present invention, the nature of which is set forth in the following general statements, preferred embodiments of which—illustrative of the best modes in which applicant has contemplated applying the principles—are set forth in the following description and illustrated in the drawings, and which are particularly and distinctly pointed out and set forth in the appended claims forming part hereof.

The nature of the concepts and discoveries of the present invention relating to procedures for manufacturing high strength wrought heat treated weldable titanium base alloy mill products having cross-sectional configurations unrestricted as to maximum dimension and having substantially uniform strength throughout from weldable shallow-hardening titanium base alloy material may be stated in general terms as including the steps of providing weldable shallow-hardening titanium base alloy material, converting said alloy material to particle form accompanied by heating at least to solution treatment temperature and by quenching; heating, compacting and consolidating by plastic deformation, reduction and working the quenched particles to the extent or degree necessary, preferably at least to 10 to 1 area reduction, to produce a ductile wrought mill product having any desired cross-sectional configuration; controlling the temperature of the alloy material during heating and hot working to a temperature not above the aging temperature range for the allow material and preferably not above the optimum aging temperature for the alloy; and completing the aging procedure by heating the consolidated ductile mill product at a temperature within the aging temperature range for said alloy material for an extended period of time.

The nature of the concepts and discoveries of the present invention relative to wrought titanium alloy mill products may be stated in general terms as comprising a high strength wrought heat treated weldable titanium base alloy mill product having a cross-sectional configuration unrestricted as to maximum dimension and having substantially uniform strength throughout, composed of titanium base alloy material containing at least one beta promoting element and which may be strengthened by solution treating, quenching and aging; characterized by having a solution treated, quenched and aged structure uniform throughout the mill product mass; further characterized by being formed of consolidated quenched particles of said alloy material having properties and structure uniform throughout in each of the quenched, quenched and hot worked, and quenched, hot worked and aged conditions; further characterized by having in the quenched condition a very fine acicular structure, by having in the quenched and hot worked condition with a 10 to 1 area reduction a very fine worked structure within prior particle boundaries, and having in the quenched, hot worked and aged condition a very fine aged structure with diminishing evidence of prior particle boundaries; further characterized by having a yield strength in excess of 160,000 p.s.i. when aged for three hours at 1050° F.; and further characterized by being weldable with retained ductility.

By way of example, procedures for the manufacture of and characteristics of the improved wrought mill products are shown in the accompanying drawings forming part hereof in which:

FIGURES 1, 2, 3, 4 and 5 are reproductions of photomicrographs of the structure of the alloy material in various stages of treatment in accordance with the concepts of the invention; and FIGS. 6 through 11 are diagrammatic views illustrating certain steps in the manufacture of wrought mill products in accordance with the invention.

Similar numerals refer to similar parts throughout the various figures of the drawings.

In accordance with the invention, weldable shallow-hardening titanium base alloy material such as disclosed in Pats. Nos. 2,864,698 and 2,864,699 may be used. For example, 7Al–2Cb–1Ta alloy material is converted to quenched particle form. This may be accomplished by the atomizing and liquid quenching procedures and using the apparatus disclosed in Kaufmann Pat. No. 3,099,041 to produce quenched fine metallic powder, particles or "shot" of the alloy material of uniform character and for example not exceeding in size 200 microns in diameter.

This procedure for converting the alloy material to particle form in general involves rotating, heating and melting the alloy material to form liquid drops within a controlled atmosphere chamber, and casting off the liquid drops by centrifugal force into a quenching environment, whereby the drops are immediately and uniformly quenched and the quenched particles produced have uniform solution treated and quenched properties of the alloy material, such properties being uniform throughout each particle and from particle to particle.

A container (FIGS. 6 and 7) preferably formed of steel and having a tubular casing 1 and plug-like members 2 and 3 is filled (FIG. 7) with the quenched alloy material particles. The end plug 2 is welded at 4 to the casing prior to filling, and after the container has been completely filled with quenched particles 5, the plug 3 is welded in place at 4. The container then is evacuated in a usual manner through a pipe 6 connected with the interior of the container through the passage 7 formed in the end plug 3. After evacuation the pipe 6 may be sealed off as indicated at 8.

A coextrusion cartridge generally indicated at 9 (FIG. 7) thus is formed, the quenched particles 5 contained in the cartridge 9 being protected within the evacuated and sealed compartment so as to avoid contamination during subsequent heating steps. The steel casing and end plugs 1, 2 and 3 are formed of any desired type of steel suitable for coextrusion, the steel container elements also serving to impart the necessary pressures to the quenched titanium alloy material particles 5 therein during extrusion to compact and consolidate the particles to form a solid product.

The cartridge 9 is then heated to a temperature not above the aging temperature range for the alloy material particles. After heating the cartridge 9 is immediately placed in a typical extrusion press. The first stage operation of the extrusion press pushes the end members 2 and 3 telescopically into the end of the casing 1 to compact the quenched alloy material particles as indicated at 5a in FIG. 8 wherein the compacted cartridge is generally indicated at 9a.

Subsequent stages of operation of the extrusion press radially reduce and longitudinally elongate the cartridge and its contents as indicated at 9b in FIG. 9. The cartridge 9b may then be reheated to not above the aging temperature range for the titanium alloy material and again extruded as indicated generally at 9c in FIG. 10.

The number of heating and extruding operations performed to reduce the cartridge 9a containing compacted alloy particles 5a and to consolidate the particles and form a solid ductile wrought mill product of the titanium alloy material depends upon the power of the extrusion press equipment used. It has been found that at least a 10 to 1 reduction in area from the compacted cartridge 9a to a finished consolidated mill product such as indicated at 5c in FIGS. 10 and 11 is necessary to obtain full and complete consolidation.

Coextrusion has been carried out in the manner described to the extent of 30 to 1 area reduction. However, it has been found that it is only necessary to hot work to at least 10 to 1 reduction to accomplish satisfactory and complete consolidation of the quench particles 5. Such 10 to 1 area reduction is accompanied by sufficient elongation or stretching of individual particles to obtain adhesion and complete consolidation thereof to solid mill product form.

After extrusion and consolidation has been completed, the steel elements 1, 2 and 3 are stripped from the consolidated ductile mill product 5c, illustrated as a bar or rod 5c in FIG. 11. The bar 5c then may be aged completely and stress relieved by heating at the desired aging temperature for the alloy material for a period of say three hours.

The conversion of the titanium base alloy material to quenched separate particle form has been described as being accomplished by atomizing and liquid quenching. This has advantages. The quenched particles, powder or "shot" produced in this manner have smooth surfaces and no pyrophoricity, and are of high purity. Thus, the particles may be handled easily after conversion to particle form and in charging the coextrusion cartridges 9.

However, it is to be understood that quenched particles of the titanium alloy material may be manufactured by other means. Thus, the alloy material may be converted to particle form in some other desired manner, and the particles heated to solution treatment temperature and then quenched to provide titanium alloy material in quenched particle form, care being taken to maintain cleanliness and prevent contamination of the material during such particle preparation.

An important aspect of this phase of the procedure is to achieve a rapid cooling rate from the beta field or high in the alpha-beta field to the alpha field of the titanium alloy material in particle form so that the particles have uniform solution treated and quenched properties throughout. These characteristics, as indicated, are the basis of achieving the superior properties in the final ductile wrought mill product.

The compacting and consolidating of the quenched particles of titanium alloy material has been described preferably as being carried out by coextrusion procedures. It is to be understood, however, that reductions and plastic deformation may also be accomplished on equipment other than an extrusion press and that plastic deformation or hot working may be carried out on forging or rolling equipment sufficiently powerful to impart the necessary pressures to obtain hot working and reduction to the necessary degree and within the temperature limitations which must be observed.

That is to say, such hot working operations must be carried out at not over aging temperature or within the aging temperature range of the particular titanium alloy material involved so that the properties developed by solution treatment and quenching of the particles are not lost.

The described hot pressure working procedure is a complete departure from procedures normally used in handling titanium alloys wherein extrusion, rolling or forging is normally carried out with the material heated to from 1600° F. to 1800° F. If the material is hot worked at these temperatures, the quenched properties would be lost and because of the shallow-hardening characteristic, such properties could not be restored by quenching of the massive section mill product.

One of the discoveries of the invention is that it has been found possible to hot extrude, hot work, plastically deform, reduce and consolidate shallow-hardening titanium alloy material in quenched particle form at temperatures within the aging temperature range for the particular alloy and thereby to retain the benefit of the properties developed in the quenched particles throughout the mass of the solid mill product produced.

After the aging procedure has been completed, which commenced during the heating and plastic deformation steps, a final solid ductile wrought mill product having any desired cross-sectional configuration is obtained that may have a heavy or massive section, yet the material throughout has the high strength (in excess of 160,000 p.s.i.) developed by the solution treatment, quench and age.

At the same time, the material is weldable since on slow cooling from welding temperature, it is essentially a single phase alloy. The strength of the material in the welded area may be reduced by slow cooling. However, because of the characteristics of the material, the welded area is ductile and can be thickened either by adding weld metal to the welded area or by otherwise thickening the metal in the welded area to obtain strength therein equal to that in an adjacent non-welded area.

When the term weldable is used herein, it is intended to indicate that welding can be performed without severe loss of ductility or without embrittlement of the material in and adjacent to the welded joint or area.

Typical properties of heat treated bar produced in accordance with the invention from 7Al–2Cb–1Ta titanium alloy material are given in Table I below for material coextruded at a temperature not above 1050° F. and then finally aged at 1050° F. for three hours.

TABLE I

|  | U.T.S., p.s.i. | YS (.2%), p.s.i. | Elongation (percent) | RA (percent) | Charpy (ft. lbs.) −80° F. Impact |
|---|---|---|---|---|---|
|  | 171,500 | 161,600 | 7.2 | 23.5 | 9.7 |
|  | 170,500 | 161,400 | 9.0 | 36.0 | 8.2 |
| Avg | 171,000 | 161,500 | 8.1 | 29.7 | 9.0 |

Typical properties of bar produced in accordance with the invention from 7Al–2Cb–1Ta titanium alloy material coextruded at not above 1050° F. but finally aged at 1150° F. for three hours are given in Table II below.

TABLE II

|  | U.T.S., p.s.i. | YS (.2%), p.s.i. | Elongation (percent) | RA (percent) | Charpy (ft. lbs.) −80° F. Impact |
|---|---|---|---|---|---|
|  | 140,800 | 133,000 | 12.2 | 44.9 | 20.2 |
|  | 134,600 | 124,000 | 13.3 | 45.2 | 18.7 |
| Avg | 137,700 | 128,500 | 12.7 | 45.1 | 19.5 |

The values in Table I illustrate that despite the shallow-hardening characteristics of the alloy, yield strength in excess of 160,000 p.s.i. is obtained in heavy section mill product form while still maintaining adequate ductility.

The values in Table II indicate that where greater ductility is desired or required, the same may be developed by increasing the aging temperature. This is accompanied by loss in strength to the average value of 128,500 p.s.i. Such strength still represents a substantial increase in strength over that present in bar stock produced from the same alloy in accordance with prior procedures.

The weldable properties of the mill product of the present invention are indicated in Table III below wherein welding conditions have been simulated by heating the material initially having the properties of Table I to 2000° F. for one hour followed by slow cooling.

TABLE III

|  | U.T.S., p.s.i. | YS (.2%), p.s.i. | Elongation (percent) | RA (percent) | Charpy (ft. lbs.) −80° F. Impact |
| --- | --- | --- | --- | --- | --- |
|  | 128,500 | 104,000 | ---------- | 12.3 | 30.6 |
|  | 126,600 | 103,300 | 12 | 16.0 | 33.4 |
| Avg | 127,550 | 103,500 | 12 | 14.2 | 32.0 |

As indicated in Table III, the strength of the material in the welded area drops to an average of 103,500 p.s.i. but ductility (12% elongation) is retained.

The structure of the alloying material at various stages in the manufacture of wrought mill products in accordance with the invention is shown in FIGS. 1 to 5. FIG. 1 is a photomicrograph of quenched particles of the 7Al–2Cb–1Ta alloy material micro-quenched from liquid and exhibits a very fine acicular structure.

FIG. 2 is a photomicrograph of compacted and consolidated quenched particles of the titanium alloy material aged-formed by extrusion of 1050° F. with a 10 to 1 reduction. A very fine worked structure within prior particle boundaries is clearly apparent.

FIG. 3 is a photomicrograph of the material after being fully aged at 1050° F. for three hours and air cooled. This illustrates the structure whose properties are given in Table I and exhibits a very fine aged structure with diminishing evidence of particle boundaries.

FIG. 4 is a photomicrograph of material extruded and fully aged at 1150° F. for three hours and air cooled whose properties are given in Table II. The structure in FIG. 4 is substantially the same as in FIG. 3.

Figure 6:
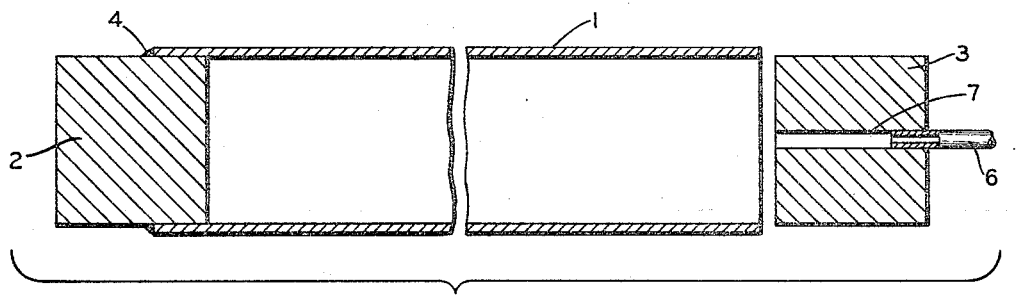
Figure 7:
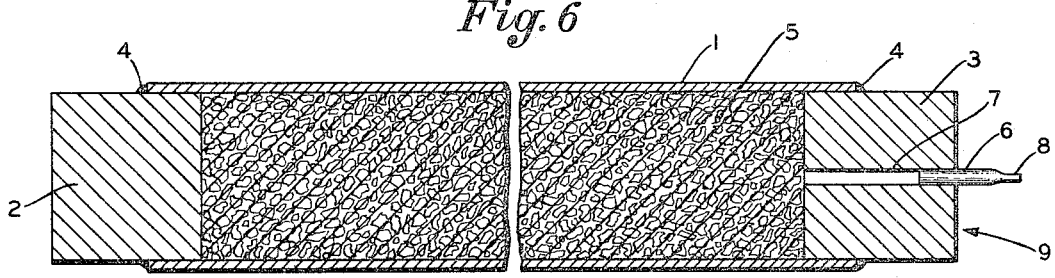
Figure 8:
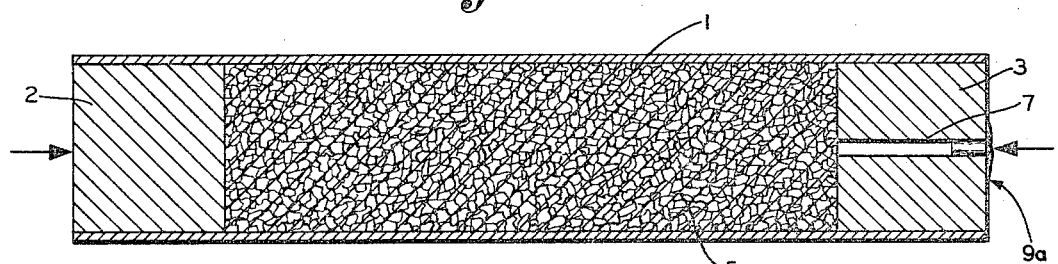
Figure 9:
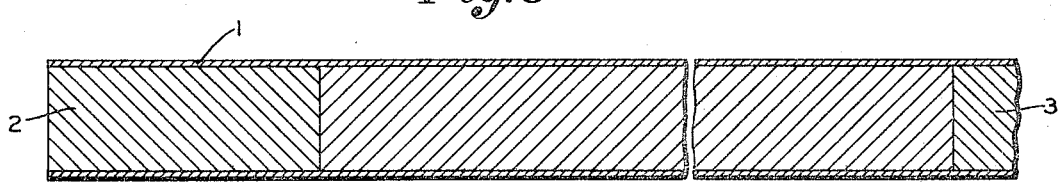
Figure 10:
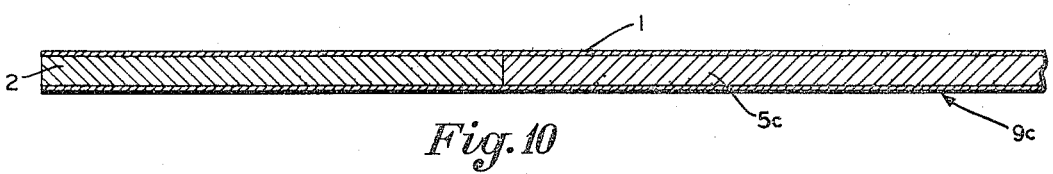
Figure 11:

FIG. 5 is a photomicrograph of the material after simulated weld treatment by heating at 2000° F. for one hour and air cooling. The properties of the material under these conditions are given in Table III. The structure is a coarsened basketweave approaching equiaxed grains.

All photomicrographs were taken with polarized light at 200 diameters magnification.

Wrought titanium base alloy mill products produced in accordance with the invention have a combination of properties which has long been sought, namely, high strength—in excess of 160,000 p.s.i.—and weldable for mill products having any desired cross-sectional configuration without limitation as to thinness or thickness.

The invention has been described with particular detailed reference to the manufacture of the improved products from a 7Al–2Cb–1Ta titanium base alloy. It is to be understood, however, that the invention is not limited to the manufacture of wrought mill products only from this particular alloy, since the new procedures of converting titanium alloy material to quenched particle form and then hot plastically deforming to the desired extent at not above the aging temperature of the particular alloy involved followed by completing the aging procedure by heating for an extended period of time at the aging temperature for the alloy, can be practiced with other shallow-hardening weldable titanium base alloys to avoid the limitation or barrier heretofore presented by the shallow-hardening characteristics of such alloys. Briefly, the mill product produced is composed throughout of micro-quenched, age-formed adherent or consolidated particles of the selected alloy.

The aging temperature, or optimum aging temperature, or aging temperature range for a particular alloy have been referred to. Such temperatures are known or can be determined for any particular titanium alloy and all will fall usually between 900° F. and 1200° F. for weldable, shallow-hardening titanium base alloys. The optimum aging temperature for any particular alloy is understood herein to be that aging temperature used for obtaining optimum combination of strength and ductility. If the optimum temperature is increased, the strength developed will be reduced and ductility increased as indicated in Tables I and II.

Accordingly, in accordance with the invention, the quenched shot or particles produced from shallow-hardening, alpha-beta titanium base alloys essentially exist in the solution treated and quenched condition, and may be termed micro-quenched material. Consolidation of the micro-quenched particles by hot working at not above the aging temperature produces products which may be described as having been age-formed. The age-forming combines partial aging and plastic deformation. The age-forming operations are carried out at a low temperature in a short time. Age-forming permits the consolidated particles to remain in the solution treated, quenched and partially aged condition with retention of properties, uniform throughout, of material so treated. After complete aging the product is uniformly strengthened throughout its entire thickness or cross section.

The wrought mill products and procedures of the invention according provide for the manufacture of ductile high strength wrought heat treated weldable titanium base alloy material mill products of any desired thickness or cross sectional configuration having uniform strength and hardness throughout and composed of micro-quenched, aged-formed consolidated adherent particles of the alloy material; provide new products having the advantages, characteristics, properties, structures and uses indicated; provide a rare new combination of properties; solve problems and satisfy needs existing in the art; eliminate difficulties heretofore encountered in the art; and obtain the new results described in a commercially satisfactory and reliably reproducible manner.

In the foregoing description certain terms have been used for brevity, clearness and understanding; but no unnecessary limitations are to be implied therefrom beyond the requirements of the prior art, because such terms are used for descriptive purposes herein and are intended to be broadly construed.

Moreover, the description and illustration of the invention and the new procedures and products are by way of example and the scope of the invention is not limited to exact details described, because various products may be manufactured without departing from the fundamental concepts and principles of the invention.

Having now described the features, concepts, discoveries and principles of the invention, the characteristics, properties and structure of the new wrought mill products, the preferred procedures to be used, and the advantageous, new and useful results obtained; the new concepts, discoveries, principles, procedures, methods, steps, treatments, mill products, and product characterizing properties and structures, and mechanical equivalents obvious to those skilled in the art are set forth in the appended claims.

I claim:
1. In a method of producing a high strength wrought heat treated weldable titanium base alloy mill product having a cross-sectional configuration unrestricted as to maximum dimension and having substantially uniform strength throughout from a weldable shallow-hardening titanium base alloy containing at least one beta promoting element and which may be strengthened by solution treating and aging, the steps of heating quenched uniformly hard particles of said alloy to a temperature within the aging temperature range for said alloy, then hot plastically deforming and reducing the heated particles to consolidate the particles and form a ductile mill product of desired cross-sectional configuration, controlling the temperature of the alloy particles during consolidation to fall within said aging temperature range, and then completing the aging procedure by heating the consolidated ductile mill product at a temperature within said aging temperature range for an extended period of time.

2. In a method of producing a high strength wrought heat treated weldable titanium base alloy mill product having a cross-sectional configuration unrestricted as to maximum dimension and having substantially uniform srtength throughout from a weldable shallow-hardening titanium base alloy containing at least one beta promoting element and which may be strengthened by solution treating and aging, the steps of heating quenched uniformly hard particles of said alloy to the optimum aging temperature for said alloy, then hot plastically deforming and reducing the heated particles to consolidate the particles and form a ductile mill product of desired cross-sectional configuration, controlling the temperature of the alloy particles during consolidation at up to said optimum temperature, and then completing the aging procedure by heating the consolidated ductile mill product at said optimum aging temperature for an extended period of time.

3. The method defined in claim 2 in which the particles consolidated and aged to form a ductile mill product are composed of a titanium base alloy consisting of 7% aluminum, 1% tantalum, 2% columbium, and the balance titanium with incidental impurities; and in which the optimum aging temperature is 1050° F.

4. In a method of producing a high strength wrought heat treated weldable titanium base alloy mill product having a cross-sectional configuration unrestricted as to maximum dimension and having substantially uniform strength throughout from a weldable shallow-hardening titanium base alloy material containing at least one beta promoting element and which may be strengthened by solution treating and aging, the steps of converting said alloy material to quenched uniformly hard particle form accompanied by heating at least to solution treatment temperature and quenching, then confining quenched particles in a metal container and heating the container and particles to the aging temperature for said alloy, then compacting the heated particles within the container, then plastically deforming and reducing the heated container and particles to consolidate the particles, continuing the consolidation of the particles while heated to aging temperature until 10 to 1 area reduction has been achieved to form a ductile mill product of desired cross-sectional configuration, controlling the temperature of the alloy particles during compaction and consolidation to a temperature at up to said aging temperature, and then completing the aging procedure by heating the consolidated ductile mill products at said aging temperature for an extended period of time.

5. In a method of producing a high strength wrought heat treated weldable titanium base alloy mill product having a cross-sectional configuration unrestricted as to maximum dimension and having substantially uniform strength throughout from a weldable shallow-hardening titanium base alloy material containing at least one beta promoting element and which may be strengthened by solution treating and aging, the steps of converting said alloy material to quenched uniformly hard particles having a very fine acicular microstructure, confining quenched particles in a metal container, exhausting and sealing the container, heating the sealed container and particles to the aging temperature for said alloy, then compacting the heated particles within the container; then coextruding the container and compacted particles to hot plastically deform, reduce and consolidate the particles; continuing the hot extrusion until at least about 10 to 1 area reduction of the consolidated particles has been achieved to form a ductile mill product of desired cross-sectional configuration, controlling the temperature of the alloy particles during compaction and extrusion at up to said aging temperature, and then completing the aging procedure by heating the extruded product at said aging temperature for an extended period of time.

6. In a method of producing a high strength wrought heat treated weldable titanium base alloy mill product having a cross-sectional configuration unrestricted as to maximum dimension and having substantially uniform strength throughout from a weldable shallow-hardening titanium base alloy material containing at least one beta promoting element and which may be strengthened by solution treating and aging, the steps of converting said alloy material to quenched uniformly hard particles having a very fine acicular microstructure, confining quenched particles in a metal container, then heating the container and particles to the aging temperature for said alloy, then compacting the heated particles within the container, then hot-pressure working the compacted particles until at least 10 to 1 area reduction of the particles has been achieved to form a ductile mill product of desired cross-sectional configuration, controlling the temperature of the particles during hot-pressure working at up to said aging temperature, and then completing the aging procedure by heating the mill product at said aging temperature for an extended period of time.

7. The method of producing a high strength wrought heat treated weldable titanium base alloy mill product having a cross-sectional configuration unrestricted as to maximum dimension and having substantially uniform strength throughout, the steps of providing weldable shallow-hardening titanium base alloy material consisting of 7% aluminum, 1% tantalum, 2% columbium, and the balance titanium with incidental impurities; heating and atomizing said alloy material, then liquid quenching said atomized material to form quenched uniformly hard particles of said alloy material having a very fine acicular microstructure, then confining quenched particles in a metal container, then heating the container and particles to 1050° F., then compacting the heated particles within the container; then coextruding the container and compacted particles to hot-pressure work, deform, reduce and consolidate the particles; continuing the hot extrusion until at least 10 to 1 area reduction of the consolidated particles has been achieved to form a ductile mill product of desired cross-sectional configuration, controlling the temperature of the particles during compaction and extrusion at up to 1050° F., and then completing the aging procedure by heating the consolidated ductile mill product at a temperature between 1050° and 1150° F. for three hours.

8. The method of producing a high strength wrought heat treated weldable titanium base alloy mill product having a cross-sectional configuration unrestricted as to maximum dimension and having substantially uniform strength throughout, the steps of providing weldable shallow-hardening titanium base alloy material consisting of 7% aluminum, 1% tantalum, 2% columbium, and the balance titanium with incidental impurities; converting said alloy material to quenched uniformly hard particle form accompanied by heating at least to solution treatment temperature and quenching, then confining quenched particles, then heating the confined particles to 1050° F., then compacting the confined heated particles, then hot-pressure working the compacted particles until at least about 10 to 1 area reduction of the particles has been achieved to consolidate the particles and form a ductile mill product of desired cross-sectional configuration, controlling the temperature of the particles during hot-pressure working at up to 1050° F., and then completing the aging procedure and stress relieving the mill product by heating the mill product at a temperature of between 1050° F. and 1150° F. for three hours.

9. The method of producing a high strength wrought heat treated weldable titanium base alloy mill product having a cross-sectional configuration unrestricted as to maximum dimension and having substantially uniform strength throughout, the steps of providing weldable shallow-hardening titanium base alloy material containing at least one beta promoting element and which may be strengthened by solution treating and aging, converting said alloy material to quenched uniformly hard particle form accompanied by heating to solution treatment temperature and quenching, then confining quenched particles, then heating the confined particles to the optimum aging temperature for said alloy, then compacting the confined heated particles, then hot-pressure working the compacted particles until at least about 10 to 1 area reduction of the particles has been achieved to consolidate the particles and form a ductile mill product of desired cross-sectional configuration, controlling the temperature of the particles during hot-pressure working at up to said optimum temperature, and then completing the aging procedure and stress relieving the mill product by heating the mill product at said optimum aging temperature for an extended period of time.

10. A ductile high strength hot worked heat treated weldable titanium base alloy material mill product having a cross-sectional configuration unrestricted as to maximum dimension and having substantially uniform strength throughout, composed throughout of micro-quenched age-formed particles consolidated as an adherent particle mass of a weldable normally shallow-hardening titanium base alloy material containing at least one beta promoting element and which may be strengthened by solution treating, quenching and aging; characterized by having properties and structure in each of quenched, quenched and hot worked, and quenched, hot worked and aged conditions uniform throughout the particle mass; further characterized by having in the quenched condition a very fine acicular structure, by having in the quenched and hot worked condition a very fine worked structure within prior particle boundaries, and by having in the quenched, hot worked and aged condition a very fine aged structure with diminishing evidence of prior particle boundaries; further characterized by having a solution treated, quenched and aged structure uniform throughout the mill product mass; further characterized by having a yield strength in excess of 160,000 p.s.i. when aged for three hours at 1050° F.; and further characterized by being weldable with retained ductility.

References Cited
UNITED STATES PATENTS
2,864,699  12/1958  Abkowitz et al. ____ 75—175.5

FOREIGN PATENTS
911,520  11/1962  Great Britain.

DAVID L. RECK, *Primary Examiner.*

H. T. SAITO, *Assistant Examiner.*